United States Patent
Tsukahara et al.

(10) Patent No.: US 11,795,584 B2
(45) Date of Patent: Oct. 24, 2023

(54) CHARGEABLE CORE/SHEATH-STRUCTURED FIBER, NONWOVEN FABRIC OBTAINED FROM SAID FIBER, COMPOSITE NONWOVEN FABRIC, NONWOVEN FABRIC PROCESSED ARTICLE, AND METHOD FOR PRODUCING NONWOVEN FABRIC PROCESSED ARTICLE

(71) Applicant: UBE EXSYMO CO., LTD., Tokyo (JP)

(72) Inventors: Tatsunori Tsukahara, Koriyama (JP); Kouki Endou, Koriyama (JP)

(73) Assignee: UBE EXSYMO CO., LTD., Tokyo (JP)

( * ) Notice: Subject to any disclaimer, the term of this patent is extended or adjusted under 35 U.S.C. 154(b) by 0 days.

(21) Appl. No.: 17/915,053

(22) PCT Filed: Mar. 18, 2021

(86) PCT No.: PCT/JP2021/011018
§ 371 (c)(1),
(2) Date: Sep. 27, 2022

(87) PCT Pub. No.: WO2021/200201
PCT Pub. Date: Oct. 7, 2021

(65) Prior Publication Data
US 2023/0122322 A1    Apr. 20, 2023

(30) Foreign Application Priority Data
Mar. 30, 2020 (JP) ................................. 2020-061323

(51) Int. Cl.
*D01F 8/06* (2006.01)
*D04H 1/4291* (2012.01)
*D04H 1/4382* (2012.01)
*D06M 10/00* (2006.01)

(52) U.S. Cl.
CPC ............. *D01F 8/06* (2013.01); *D04H 1/4291* (2013.01); *D04H 1/43828* (2020.05); *D04H 1/43835* (2020.05); *D06M 10/00* (2013.01); *D10B 2321/022* (2013.01); *D10B 2401/18* (2013.01); *D10B 2505/04* (2013.01)

(58) Field of Classification Search
CPC ............. D04H 1/4291; D04H 1/43828; D04H 1/43835; D01F 8/06; D06M 10/00; D10B 2505/04; D10B 2321/022; D10B 2401/18
See application file for complete search history.

(56) References Cited

U.S. PATENT DOCUMENTS

| | | | | |
|---|---|---|---|---|
| 2005/0268817 A1* | 12/2005 | Iwata | ............. | D06M 15/53 |
| | | | | 106/146.1 |
| 2013/0237111 A1 | 9/2013 | Crown et al. | | |
| 2021/0025080 A1* | 1/2021 | Larios | ............. | D01F 1/10 |

FOREIGN PATENT DOCUMENTS

| | | | |
|---|---|---|---|
| CN | 104357952 A | 2/2015 | |
| CN | 108049029 A | 5/2018 | |
| CN | 110886033 A | 3/2020 | |
| JP | 2002-339256 A | 11/2002 | |
| JP | 2007-308839 A | 11/2007 | |
| JP | 2008-196077 A | 8/2008 | |
| JP | 2009-209506 A | 9/2009 | |
| JP | 4670471 B2 | 4/2011 | |
| JP | 2011-179135 A | 9/2011 | |
| JP | 2020-050965 A | 4/2020 | |
| WO | WO-2017186935 A1 * | 11/2017 | ........ A61F 13/51121 |

OTHER PUBLICATIONS

English translation of JP 2007-308839 to Miyachi et al. obtained from PE2E database. (Year: 2007).*
International Search Report for PCT/JP2021/011018, dated Apr. 13, 2021, and English Translation submitted herewith (5 pages).
TIRO; Application No. 11020840050; Office Action dated Aug. 30, 2021.

* cited by examiner

*Primary Examiner* — Jeremy R Pierce
(74) *Attorney, Agent, or Firm* — Fitch, Even, Tabin & Flannery LLP

(57) ABSTRACT

The present invention provides a chargeable sheath/core-structured fiber that contains a polypropylene-based resin as a main resin, wherein the sheath part contains (a) a carboxylic anhydride-modified polyolefin and (b) at least one antioxidant selected from the group consisting of a combined antioxidant a phenolic antioxidant and a phosphorus-based antioxidant, and sulfur-based antioxidants; and (c) an oil containing a polyoxyalkylene alkyl ether represented by the general formula (I) as a finishing oil is deposited on the outer surface of the sheath part, and that can satisfy heat resistance and charge retainability. (In the formula, $R^1$ represents a saturated or unsaturated aliphatic hydrocarbon group having 10 to 30 carbon atoms; $R^2$ represents a hydrogen atom or a methyl group; and k is an integer of 1 to 4.)

General Formula (I)

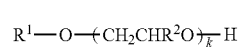

14 Claims, No Drawings

CHARGEABLE CORE/SHEATH-STRUCTURED FIBER, NONWOVEN FABRIC OBTAINED FROM SAID FIBER, COMPOSITE NONWOVEN FABRIC, NONWOVEN FABRIC PROCESSED ARTICLE, AND METHOD FOR PRODUCING NONWOVEN FABRIC PROCESSED ARTICLE

CROSS-REFERENCE TO RELATED APPLICATIONS

This application is a U.S. national phase application filed under 35 U.S.C. § 371 of International Application Number PCT/JP2021/011018, filed Mar. 18, 2021, designating the United States, which claims priority from Japanese Application Number 2020-061323, filed Mar. 30, 2020.

FIELD OF THE INVENTION

The present invention relates to a chargeable sheath/core-structured fiber and the like that can retain a high electret function even in a high-temperature environment.

BACKGROUND OF THE INVENTION

In recent years, along with the growth of the awareness of antismoking and the increase of hay fever and allergic symptoms by house dusts, and the like, the consciousness of air cleaning in houses and cars has been improved and the demand for air filters and the like has been increased. For such filters, polyolefinic resin fibers are usually used and electret nonwoven fabrics utilizing an electrostatic collecting function are utilized.

As the above electret nonwoven fabrics, ones using staple fibers as raw fibers are known; in order to form nonwoven fabrics from the staple fibers, there is usually used the means in which the staple fibers are passed through a carding machine to be opened and webbed, and thereafter subjected to fusion bonding, entanglement or the like. Such nonwoven fabrics are electretized by a method of thermoelectret, electroelectret or the like to be rendered electret nonwoven fabrics.

In production of the above nonwoven fabrics using staple fibers, it is needed to suppress generation of static electricity in a carding process; hence, an oil such as a surfactant having an antistatic capability is usually deposited on the raw fiber. Such an oil, however, hinders the electretization of the nonwoven fabrics, and besides, even when the nonwoven fabrics have been electretized, causes the lowering of the capabilities such as the dust filtration efficiency (collection efficiency) in a relatively short time. Hence, when the amount of the oil deposited on the raw fiber is attempted to be reduced, it becomes easy for the static electricity to be generated in the carding process, adversely affecting the operability, and posing problems of making it difficult for the nonwoven fabrics to be formed, decreasing the yield, and the like.

Before the electretization of nonwoven fabrics, the means of cleaning and removing an oil deposited, or removing an oil component simultaneously with the entanglement by a water jet method, or the like, is adopted in some cases. In this case, however, an increase of processes and the installation of new facilities are needed, posing problems of rendering the production cost high, and the like.

Under such a situation, Patent Literature 1 discloses a polyolefinic heat-adhesive fiber for an electret nonwoven fabric that can provide a nonwoven fabric capable of retaining a good electret capability for a long period, wherein (1) the fiber is composed of a polyolefinic heat-adhesive fiber having 0.2 to 0.6% by weight of an oil deposited thereon, and (2) in formation of the nonwoven fabric using a heat treatment and/or in a heat treatment after formation of the nonwoven fabric, the amount of the oil deposited on the nonwoven fabric is reduced to 0.001 to 0.2% by weight and the reduction rate of the amount of the oil deposited can become 60% or higher.

On the other hand, Patent Literature 2 raises problematic points, in the invention of Patent Literature 1, of such a restriction that a heat treatment process is necessarily needed before electret processing, and of the necessity of such a high quality control technology that the amount of a fiber treating agent to be deposited is controlled to a specified amount or smaller, and proposes an invention which can overcome these.

That is, Patent Literature 2 discloses a chargeable fiber for carding having a nonionic treating agent containing 50% by weight or more of at least one selected from the group consisting of specific sorbitan fatty acid esters and specific polyoxyethylene alkylene alkyl ethers deposited thereon at 0.01 to 1.5% by weight based on the fiber.

CITATION LIST

Patent Literature

PTL1: JP 2002-339256 A
PTL2: JP 4670471 B

SUMMARY OF INVENTION

However, the invention of Patent Literature 1 requires such a restriction that a heat treatment process is necessarily needed before electret processing, and such a high quality control technology that the amount of a fiber treating agent to be deposited is controlled to not more than a specified amount. Further, the invention has a problem of not satisfying heat resistance and charge retainability in the application to vehicular filters because the invention uses a high-density polyethylene as a sheath component.

Further, the invention described in Patent Literature 2 has such a problem that in the nonionic fiber treating agent containing a polyoxyalkylene alkyl ether represented by a general formula, when the number of moles of oxyalkylene added is 5 or more, the viscosity of an oil rises; and when the amount deposited based on the fiber is made small, deposition spots of the oil are caused, making uniform deposition difficult.

The vehicular filters need the heat resistance capable of withstanding high temperatures as the indoor temperature is 80° C. or higher in the summertime, and in order to raise the collection efficiency of refuse, dusts and the like, need a charge retention rate at high temperatures.

The present invention has solved the above problem and has an object to provide a chargeable sheath/core-structured fiber capable of satisfying the heat resistance and the charge retainability particularly in applications to vehicular filters and the like.

As a result of exhaustive studies in order to achieve the above object in consideration of the above conventional technical problematic points, the present inventors have found that the object can be achieved by providing a chargeable sheath/core-structured fiber which is a sheath/core-structured fiber wherein the sheath part comprises (a) 3 to 20% by mass of a carboxylic anhydride-modified polyolefin and (b) a specific antioxidant, and (c) a predetermined amount of an oil containing 50% by mass or more of a specific polyoxyalkylene alkyl ether as a finishing oil is deposited on the outer surface of the sheath part, and this finding has led to the completion of the present invention.

That is, the present invention provides the following aspects of the invention of [1] to [14].

[1] A chargeable sheath/core-structured fiber, being a sheath/core-structured fiber comprising a polypropylene-based resin as a main resin in the sheath part and the core part and having a mass ratio of the sheath part to the core part of 70/30 to 30/70, wherein the sheath part comprises (a) 3 to 20% by mass of a carboxylic anhydride-modified polyolefin and (b) 0.5 to 3.0% by mass of at least one antioxidant selected from the group consisting of a combined antioxidant of a phenolic antioxidant and a phosphorus-based antioxidant, and sulfur-based antioxidants; and (c) 0.1 to 1.0% by mass, based on the total mass of the sheath/core-structured fiber, of an oil containing 50% by mass or more of a polyoxyalkylene alkyl ether represented by the general formula (I) as a finishing oil is deposited on the outer surface of the sheath part.

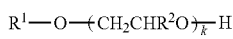

General Formula (I)

wherein $R^1$ represents a saturated or unsaturated aliphatic hydrocarbon group having 10 to 30 carbon atoms; $R^2$ represents a hydrogen atom or a methyl group; and k is an integer of 1 to 4.

[2] The chargeable sheath/core-structured fiber according to the above [1], wherein the finishing oil is polyoxyethylene (4) lauryl ether, which corresponds to the general formula (I) wherein k is 4.

[3] The chargeable sheath/core-structured fiber according to the above [1] or [2], wherein the phosphorus-based antioxidant is tris(2,4-di-t-butylphenyl) phosphite.

[4] The chargeable sheath/core-structured fiber according to any one of the above [1] to [3], wherein the polypropylene-based resin is a homopolypropylene; and the (a) carboxylic anhydride-modified polyolefin is a maleic anhydride-modified polypropylene.

[5] The chargeable sheath/core-structured fiber according to any one of the above [1] to [4], wherein the fiber has a fiber length of 3 to 120 mm and a fineness of 0.5 to 10 dtex.

[6] A nonwoven fabric, being obtained by a dry nonwoven fabric processing method using the chargeable sheath/core-structured fiber according to any one of the above [1] to [5] alone, or the chargeable sheath/core-structured fiber mixed with a heat-adhesive fiber and/or another fiber.

[7] The nonwoven fabric according to the above [6], wherein the dry nonwoven fabric processing method is any one selected from the group consisting of a thermal bond method, a needle-punched method, a spunlace method, a chemical bond method and an air-laid method.

[8] The nonwoven fabric according to the above [6] or [7], wherein the heat-adhesive fiber is a sheath/core-structured fiber comprising a low-melting point component as a sheath component; and the sheath component is a polyethylene-based resin.

[9] A composite nonwoven fabric, being obtained by combining the chargeable sheath/core-structured fiber according to any one of the above [1] to [5] with at least one selected from the group consisting of other fibers, nonwoven fabrics, films, pulp sheets, knitted fabrics and woven fabrics.

[10] A nonwoven fabric processed article, comprising the nonwoven fabric according to any one of the above [6] to [8], or the composite nonwoven fabric according to the above [9].

[11] The nonwoven fabric processed article according to the above [10], wherein the nonwoven fabric processed article has been electretized.

[12] The nonwoven fabric processed article according to the above [11], wherein the nonwoven fabric processed article is any one of an air filter, a wiper and a mask.

[13] The nonwoven fabric processed article according to the above [12], wherein the air filter is a vehicular air filter.

[14] A method for producing a nonwoven fabric processed article, comprising a step of electretizing the nonwoven fabric according to any one of the above [6] to [8] or the composite nonwoven fabric according to the above [9].

According to the present invention, there can be provided a chargeable sheath/core-structured fiber effectively utilizable as a constituent fiber for vehicular filters requiring a heat resistance and a high electret function, and a nonwoven fabric, a composite nonwoven fabric and a nonwoven fabric processed article obtained from the fiber, and a method for producing a nonwoven fabric processed article.

Further, although the main resin is a polypropylene resin, by adding, for surface modification, (b) a maleic anhydride-modified polyolefin and (b) an antioxidant only to the sheath part, as compared with the case where these are added also to the core component, the cost of a surface modifying agent can be reduced and a balance between the performance and the cost can be attained.

DESCRIPTION OF EMBODIMENTS

Hereinafter, preferred embodiments of the present invention will be described.

The present invention is a chargeable sheath/core-structured fiber, being a sheath/core-structured fiber comprising a polypropylene-based resin as a main resin in the sheath part and the core part and having a mass ratio of the sheath part to the core part of 70/30 to 30/70, wherein the sheath part comprises (a) 3 to 20% by mass of a carboxylic anhydride-modified polyolefin and (b) 0.5 to 3.0% by mass of at least one antioxidant selected from the group consisting of a combined antioxidant of a phenolic antioxidant and a phosphorus-based antioxidant, and sulfur-based antioxidants; and (c) 0.1 to 1.0% by mass, based on the total mass of the sheath/core-structured fiber, of an oil containing 50% by mass or more of a polyoxyalkylene alkyl ether represented by the general formula (I) as a finishing oil is deposited on the outer surface of the sheath part.

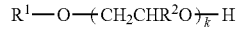

General Formula (I)

wherein $R^1$ represents a saturated or unsaturated aliphatic hydrocarbon group having 10 to 30 carbon atoms; $R^2$ represents a hydrogen atom or a methyl group; and k is an integer of 1 to 4.

The sheath/core-structured fiber of the present invention comprises a polypropylene-based resin as a main resin in the sheath part and the core part, and has a mass ratio of the sheath part to the core part of 70/30 to 30/70. It is preferable that the mass ratio of the sheath part to the core part is 50/50 to 40/60 (sheath part/core part), from the viewpoint of the stability of melt spinning of the sheath/core-structured fiber, and the like, and from the relationship with the amounts of (a) a carboxylic anhydride-modified polyolefin and (b) an antioxidant to be added to the sheath part, which are described later, and the like.

<Polypropylene-Based Resin>

It is preferable that the polypropylene-based resin to be used for the sheath part and the core part of the present invention is a high-melting point homopolypropylene, because for vehicular filters and the like, a high heat resistance is demanded in use. Out of the high-melting point homopolypropylene, a crystalline polypropylene is especially preferable. As the crystalline polypropylene, an isotactic polypropylene-based resin is preferably used. Out of the isotactic polypropylene-based resin, advantageous is one having an isotactic pentad fraction (IPF) of preferably 85% or higher, more preferably 90% or higher. Then, it is preferable that the Q value (weight-average molecular weight/number-average molecular weight, Mw/Mn ratio) being an index of the molecular weight distribution is 6 or less, and the melt flow rate (MFR) (temperature: 230° C., load: 2.16 kg) is in the range of 3 to 100 g/10 min. With the IPF being lower than 85%, the stereoregularity is insufficient and the crystallinity is low, and physical properties such as the strength of the fiber to be obtained are inferior.

Here, the isotactic pentad fraction (IPF) (generally also called mmmm fraction) indicates a proportion of a steric structure in which any group of five methyl groups being side chains is positioned in the same direction to the main chain of carbon-carbon bonds constituted by any five consecutive propylene units, and can be determined from a Pmmmm (an absorption intensity originated from a methyl group on the third unit in a site where five propylene units are consecutively isotactically bonded in an isotopic carbon nuclear magnetic resonance spectrum ($^{13}$C-NMR) and a Pw (an absorption intensity originated from all the methyl groups of the propylene units) by the following equation:

$$IPF\ (\%) = (Pmmmm/Pw) \times 100$$

<(a) Carboxylic Anhydride-Modified Polyolefin>

It is preferable that the carboxylic anhydride-modified polyolefin (hereinafter, referred to as "modifying agent" in some cases) to be contained in the sheath part is a polyolefin modified with an anhydride of a carboxylic acid compound having an unsaturated bond, and it is more preferable that the carboxylic anhydride-modified polyolefin is a carboxylic anhydride-modified polypropylene, from the viewpoint of the affinity for the polypropylene-based resin of the sheath component. Further, it is preferable that the carboxylic anhydride for the modification is maleic anhydride.

In particular, a maleic anhydride-random graft modified polypropylene is preferably one modified by grafting one or more maleic anhydrides on one molecule. The random graft modified polypropylene-based polymer is obtained, for example, by making radicals to be generated in a polypropylene-based polymer molecule and reacting the resultant with a carboxylic acid compound having an unsaturated bond or an anhydride thereof.

Examples of commercially available products of random graft modified polypropylene-based polymers include, as maleic anhydride-random graft modified polypropylene, "Toyotack" series, "M-100", "M-300", "M-310", "PMA H1000A", "PMA H1100A", "PMA H3000A", "PMA-T", "PMA-F2" and "PMA-L" (the foregoing, manufactured by Toyobo Co., Ltd.), "Umex" series, "1001", "1010", "100TS" and "110TS" (the forgoing, manufactured by Sanyo Chemical Industries, Ltd), and "Kayabrit" series, "003" and "006" (the forgoing, manufactured by Akzo Nobel N.V.).

The carboxylic anhydride-modified polyolefin is blended at 3 to 20% by mass, preferably 5 to 15% by mass and more preferably 7 to 12% by mass, based on the mass of the sheath part. With being less than 3% by mass, since the additive component present on the fiber surface is too little, the charge retention rate at high temperatures cannot be secured; and with being more than 20% by mass, since the MFR of the additive is high, spinning becomes difficult and the stable production cannot be carried out.

<(b) Antioxidant>

In the present invention, the sheath part of the chargeable sheath/core-structured fiber is made to contain 0.5 to 3.0% by mass of at least one antioxidant selected from the group consisting of a combined antioxidants of a phenolic antioxidant and a phosphorus-based antioxidant, and sulfur-based antioxidants.

A first combination of antioxidants is a combination of a phenolic antioxidant and a phosphorus-based antioxidant.

The phenolic antioxidant includes monophenolic antioxidants such as 2,6-t-butylphenol, 2-t-butyl-4-methoxyphenol, 3-t-butyl-4-methoxyphenol, 2,4-dimethyl-6-t-butylphenol, 2,6-di-t-butyl-p-cresol, 2,6-di-t-butyl-4-ethylphenol, n-octadecyl-3-(3,5-di-t-butyl-4-hydroxyphenyl) propionate and methyl hydroquinone; bisphenolic antioxidants such as 2,2'-methylenebis(4-methyl-6-t-butylphenol), 2,2'-methylenebis (4-ethyl-6-t-butylphenol), 4,4'-thiobis(3-methyl-6-t-butylphenol), 4,4'-butylidenebis(3-methyl-6-t-butylphenol), 3,9-bis[1,1-dimethyl-2-[β-(3-t-butyl-4-hydroxy-5-methylphenyl)propionyloxy]ethyl]-2,4,8,10-tetra-oxaspiro [5.5]undecane and 2,2'-dihydroxy-3,3'-di(α-methylcyclohexyl)-5,5'-dimethyldiphenylmethane; trisphenolic antioxidants such as 1,1,3-tris(2-methyl-4-hydroxy-5-t-butylphenyl)butane and 1,3,5-trimethyl-2,4,6-tris (3,5-t-butyl-4-hydroxybenzyl)benzene; tetrakisphenolic antioxidants such as tetrakis-[methylene-3-(3',5'-di-t-butyl-4'-hydroxyphenyl) propionate]methane and tetrakis-[ethylene-3-(3',5'-di-t-butyl-4'-hydroxyphenyl) propionate]methane; tocopherols such as D-α-tocopherol, L-α-tocopherol, D-β-tocopherol, L-β-tocopherol, D-γ-tocopherol, L-γ-tocopherol, D-δ-tocopherol and L-δ-tocopherol; and tocotrienols such as D-α-tocotrienol, L-α-tocotrienol, D-β-tocotrienol, L-β-tocotrienol, D-γ-tocotrienol, L-γ-tocotrienol, D-δ-tocotrienol an L-δ-tocotrienol.

Among these, tetrakis-[methylene-3-(3',5'-di-t-butyl-4'-hydroxyphenyl) propionate]methane is preferably used because the effect in the case of being used in combination with a phosphorus-based antioxidant is excellent.

Further, in the present invention, the phosphorus-based antioxidant usable in combination with the phenolic antioxidant includes triphenyl phosphite, diphenyl isodecyl phosphite, phenyl diisodecyl phosphite, 4,4'-butylidene-bis (3-methyl-6-t-butylphenyl ditridecyl) phosphite, cyclic neopentanetetrayl bis(octadecyl phosphite), tris(nonylphenyl) phosphite, tris(2,4-di-t-butylphenyl) phosphite, cyclic neopentanetetrayl bis(2,6-di-t-butyl-4-methylphenyl) phosphite, and 2,2-methylenebis(4,6-di-t-butylphenyl) octyl phosphite.

Among these, tris(2,4-di-t-butylphenyl) phosphite is included as a preferable antioxidant from the viewpoint of the persistence of the charging effect at high temperatures.

The mass ratio in the case of using the phenolic antioxidant and the phosphorus-based antioxidant in combination can suitably be varied according to the kinds of the agents to be used, and is in the range of 1:0.1 to 1:15 and preferably in the range of 1:1 to 1:5.

Further, the sulfur-based antioxidant includes dilauryl 3,3'-thiodipropionate, dimyristyl 3,3'-thiodipropionate, distearyl 3,3'-thiodipropionate, 1,1'-dithiobisoctadecane and pentaerythrityl-tetrakis(3-lauryl thiopropionate).

Among these, 1,1'-dithiobisoctadecane is preferable from the viewpoint of the compatibility with the polyolefin.

In the present invention, with regard to the amount of each antioxidant to be blended in the sheath part of the chargeable sheath/core-structured fiber, the antioxidant needs to be contained at 0.5 to 3.0% by mass, and is preferably contained at 0.7 to 2.0% by mass. Although it is usual that an antioxidant is used in a proportion of 0.1% by mass or lower (ppm order) in terms of pure content, in the present invention, the antioxidant of as much as 0.5% by mass or higher is made to be contained. With being lower than 0.5% by mass, the absolute value of the charge retention rate is not raised. On the other hand, with being higher than 3% by mass, the amount of the antioxidant coordinated on the sheath component surface becomes large, adversely affecting the chargeability.

<(c) Finishing Oil>

The finishing oil to be deposited on the sheath part surface of the chargeable sheath/core-structured fiber of the present invention contains 50% by mass or more of a polyoxyalkylene alkyl ether represented by the following general formula (I), and is deposited at 0.1 to 1.0% by mass based on the total mass of the sheath/core-structured fiber.

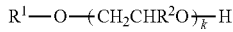

General Formula (I)
$$R^1-O-(CH_2CHR^2O)_k-H$$

wherein $R^1$ represents a saturated or unsaturated aliphatic hydrocarbon group having 10 to 30 carbon atoms; $R^2$ represents a hydrogen atom or a methyl group; and k is an integer of 1 to 4.

As the finishing oil, more preferable is a finishing oil which contains 50% by mass or more of polyoxyethylene(4) lauryl ether, which is a polyoxyethylene in the case where $R^1$ of a polyoxyalkylene alkyl ether of the above general formula (I) is a lauryl group, $R^2$ thereof is hydrogen, and k thereof is 4, from the viewpoint of the uniform deposition property to the fiber, the chargeability and the charge retainability.

In the present invention, the finishing oil to be deposited on the sheath part surface needs to be deposited at 0.1 to 1.0% by mass, and is deposited at preferably 0.2 to 0.8% by mass and more preferably 0.3 to 0.7% by mass, based on the total mass of the sheath/core-structured fiber. With being less than 0.1% by mass, static electricity is generated when the chargeable sheath/core-structured fiber is carded, making carding processing impossible.

On the other hand, with being more than 1.0% by mass, the oil component bleeds out on the fiber surface and deteriorates the chargeability when the electret capability is developed.

When the above polyoxyethylene(4) lauryl ether as a preferable oil is used, particularly the above range of the amount to be deposited is recommended.

In the chargeable sheath/core-structured fiber of the present invention, the cross section thereof orthogonal to the fiber axis direction has a sheath/core structure, and although the sheath part needs to cover the whole surface of the core part, the sheath/core structure is not necessarily concentric, but may be more or less eccentric. The central portion may have a hollow structure. The chargeable sheath/core-structured fiber is made by once taking up an undrawn fiber spun by a melt spinning machine capable of spinning into a sheath/core structure, or introducing the undrawn fiber directly to a drawing machine and then drawing the undrawn fiber in a predetermined draw ratio, and successively imparting a predetermined crimping to the drawn fiber by a crimper such as a stuffing box crimper. Usually, the finishing oil is imparted to the fiber before or after the crimp imparting process by a spray method, a method of impregnation in an oil bath, or the like.

The drawn fiber imparted with the above-mentioned finishing oil peculiar to the present invention is passed through a drying apparatus to remove moisture of the finishing oil, and thereafter cut into a predetermined fiber length.

In the chargeable sheath/core-structured fiber of the present invention, the amount of the finishing oil to be deposited is controlled so as to become a predetermined value in an oil imparting process.

It is preferable that the fiber length is 3 to 120 mm, from the relationship with using of carding for fiber opening and the structure of a nonwoven fabric to be finally obtained. Then, it is preferable that the fineness of the chargeable sheath/core-structured fiber is 0.5 to 10 dtex, from the relationship with the structure of a desired nonwoven fabric.

The number of crimping of the chargeable sheath/core-structured fiber of the present invention is not especially limited, but in the case of webbing by an air-laid method, the range of 0 to 15 crests/25 mm is preferable, because the web formation becomes good. At this time, with the number of crimping by far exceeding 15 crests/25 mm, the entanglement among fibers become much and the fiber opening property lowers, making it difficult for a uniform-texture web and further, nonwoven fabric to be obtained. As the crimp shape, any shape can be used, such as a zigzag-type two-dimensional crimp shape, or a three-dimensional crimp shape of a spiral type, an ohm type or the like.

By a dry nonwoven fabric processing method using the chargeable sheath/core-structured fiber of the present invention alone, or the chargeable sheath/core-structured fiber mixed with a heat-adhesive fiber and/or another fiber, a nonwoven fabric can be provided.

A nonwoven fabric can be obtained by any one dry nonwoven fabric processing method selected from the group consisting of a thermal bond method, a needle-punched method, a spunlace method, a chemical bond method and an air-laid method, and the nonwoven fabric may be one obtained by the any method. The nonwoven fabric obtained is electretized, and can be used for vehicular air filters, wipers for cleaning household furniture, floors and the like, air filters to be used for air conditioning facilities, masks, and the like.

The heat-adhesive fiber is a sheath/core-structured fiber containing a low-melting point component as a sheath component, and a nonwoven fabric, in which a fiber whose sheath component is a polyethylene-based resin and the chargeable sheath/core-structured fiber of the present invention are mixed, can secure the mechanical strength of the nonwoven fabric by heat fusion bonding at a relatively low temperature, which is preferable in the points of the electret function and the heat energy cost for processing.

In the present invention, a composite nonwoven fabric is provided which is obtained by combining the chargeable sheath/core-structured fiber with at least one selected from the group consisting of other fibers, nonwoven fabrics, films, pulp sheets, knitted fabrics and woven fabrics.

In order to obtain a composite nonwoven fabric by the combination, the above-mentioned dry nonwoven fabric processing method may suitably be utilized, or lamination and adhesion may be carried out. The composite nonwoven fabric is, for example, by being laminated with a net, caused to have a mechanical strength and a rigidity, and enabled to be subjected to pleating in the processing of a filter, and enabled to hold a strength of the filter itself.

The nonwoven fabric or the composite nonwoven fabric is provided as a nonwoven fabric processed article subjected to, for example, angle processing or pleating according to applications.

It is preferable that the nonwoven fabric processed article is subjected to an electretization treatment by a thermal electretization method, which imparts a charge in such a heated atmosphere that the fiber is not melted, or a corona discharge method, which imparts a charge by corona discharge, to thereby charge the nonwoven fabric and impart properties such as the collection function to the nonwoven fabric. The electretization treatment method is not especially limited thereto.

The nonwoven fabric processed article can be provided as a nonwoven fabric processed article which is any one of an air filter, a wiper and a mask.

The air filter can be provided as a nonwoven fabric processed article which is a vehicular air filter. Since the chargeable sheath/core-structured fiber of the present invention contains the polypropylene-based resin as a main component, the nonwoven fabric containing the resin has a heat resistance capable of withstanding 80° C. in high temperature times in the summertime required for vehicular filters, and conjointly with the high electret function, can suitably be utilized as the vehicular air filter.

The present invention also provides a method for producing a nonwoven fabric processed article, the method comprising a step of electretizing the nonwoven fabric or the composite nonwoven fabric.

The electretization treatment suffices if there is carried out an electretization treatment by a thermal electretization method, which imparts a charge in such a heated atmosphere that the fiber is not melted, a corona discharge method, which imparts a charge by corona discharge, or other methods, to thereby charge the nonwoven fabric and impart properties such as the collection function to the nonwoven fabric.

EXAMPLES

Then, the present invention will be described in more detail by way of Examples, but the present invention is not any more limited to these Examples. Here, measurement methods of values of physical properties indicated in Examples and Comparative Examples are collectively shown below.

Single yarn fineness: the single yarn fineness was measured according to JIS L1015.

Basis weight: a nonwoven fabric is cut into a piece of 50 cm square and the whole of the piece was weighed and the basis weight was indicated in a weight per unit area (g/m$^2$).

Amount of a finishing oil deposited (%): by using a quick residual fat extraction device (manufactured by Tokai Keiki, type: R-II), an oil deposited on 2 g of a dried fiber was extracted twice with 10 ml of a mixed solvent of ethyl alcohol and methyl alcohol in a weight ratio of 2:1, and the amount of the oil extracted was measured.

Charge quantity of a nonwoven fabric: a direct current of 10 kV was applied to a nonwoven fabric in an atmosphere of 110° C. to electretize the nonwoven fabric to thereby fabricate an electret nonwoven fabric, and the charge quantity right after the fabrication was measured. Further, the electret nonwoven fabric was heat treated at 90° C. for 2 hours, and stored in a thermostatic chamber at 20° C. and a humidity of 65%, and charge quantities after 5 s, 10 s, 60 s, 180 s, 300 s and 600 s were measured by an electrostatic potentiometer STATIRON-DZ4, manufactured by Shishido Electrostatic, Ltd., and the retention rate to the initial charge quantity was calculated.

Processing of a nonwoven fabric: a raw fiber in Examples and Comparative Examples was opened by a carding machine, and subjected to punching with 80 punches/cm$^2$ by a needle-punching machine to thereby obtain a nonwoven fabric.

Example 1

As a polypropylene-based resin for a sheath part and a core part, a homopolypropylene [manufactured by Prime Polymer Co., Ltd., RS1238A (melt flow rate (MFR) at 230° C. and a load of 2.16 kg: 40 g/10 min, melting point: 160° C.)] was used, and a sheath-side raw material was prepared such that the mass ratio of the sheath part to the core part was 50/50 parts by mass.

(Preparation of the Sheath-Side Raw Material)

Mixed by a blender were sheath component raw materials of as (a) a carboxylic anhydride-modified polyolefin, 10% by mass of a maleic anhydride-modified polypropylene (manufactured by Sanyo Chemical Industries, Ltd., Umex 1001, maleic anhydride content: 1.7% by mass, MFR at 230° C./2.16 kg: 1,550 g/10 min, melting point: 142° C.); as (b) an antioxidant, 20% by mass of a homopolypropylene-based masterbatch (manufactured by Tokyo Printing Ink MFG. Co., Ltd., "PPM AO-141"), which contained a homopolypropylene [manufactured by Prime Polymer Co., Ltd., RS1238A] as a main raw material, and 5% by mass of a sulfur-based antioxidant, wherein the content of the antioxidant in the whole was 1% by mass; and 70% by mass of the above homopolypropylene.

(Spinning of a Chargeable Sheath/Core-Structured Fiber)

Then, the raw materials for the core part and the raw material for the sheath part were fed to respective melt extruders, and spinning was carried out by using a sheath/core conjugate spinning nozzle at a spinning temperature of 280° C. and at a spinning (taking up) speed of 530 m/min under measurement of the amount of the resin to be discharged in a predetermined mass by a melt resin gear pump equipped on a spinning nozzle head part, to thereby obtain an undrawn fiber tow having gathered undrawn chargeable sheath/core-structured fibers having a mass ratio (sheath/core ratio) of the sheath and the core of 50/50 and a single yarn fineness of 5.5 dtex.

(Drawing)

Then, the undrawn fiber tow obtained was introduced to a drawing facility equipped with three-stage rollers (G1, G2, G3) having different surface speeds, and equipped with thermally drawing chamber between the rollers, and drawn in two stages under the conditions: the first drawing roller (G1)=33.3 m/min, the first drawing chamber temperature=114° C. (steam), the second drawing roller (G2) speed=95.2 m/min, the second drawing chamber temperature=114° C. (steam), and the third drawing roller (G3) speed=100 m/min; and the first draw ratio (G2/G1 speed ratio)=3.0 times, the second draw ratio (G3/G2 speed ratio)=1.05 times, and the total draw ratio (G3/G1 speed ratio)=3.0 times.

(Impartation of Crimping, Deposition of (c) a Finishing Oil)

Following the drawing, the resultant fiber was imparted with crimping of the number of crimps of 6/cm by a stuffing box, and then, a mixed finishing oil, as a (c) finishing oil, of an oil (manufactured by Kao Corporation., "Emulgen 104P") containing 50% by mass or more of polyoxyethylene (4) lauryl ether as a main component diluted with water was deposited so that the target deposition amount after drying became 0.4% by mass, and thermally dried to thereby fabricate a chargeable sheath/core-structured fiber having a fineness of 2.2 dtex and a length of 51 mm.

Then, the chargeable sheath/core-structured fiber (raw fiber) having 0.4% by mass of the finishing oil deposited thereon was opened by a carding machine, and subjected to punching of a needle-punched density of 80 punches/cm by a needle-punching machine to thereby obtain a nonwoven fabric having a basis weight of 50 g/m².

(Fabrication of an Electret Nonwoven Fabric)

The above nonwoven fabric was electretized in an atmosphere of 110° C. by applying a direct current of 10 kV, to thereby fabricate an electret nonwoven fabric. The electret nonwoven fabric was confirmed to be good in the chargeability and the charge retention rate.

There are collectively shown in Table 1, the raw material constituents of the chargeable sheath/core-structured fiber, the physical properties of the raw fiber and the nonwoven fabric from the chargeable sheath/core-structured fiber, and the amount of the finishing oil deposited, and the evaluation results of the electret capability of the nonwoven fabric.

Example 2

A chargeable sheath/core-structured fiber, a nonwoven fabric and an electret nonwoven fabric were obtained as in Example 1, except for blending, in the sheath components, as the (b) antioxidant of the sheath-side raw material, 20% by mass of a homopolypropylene-based masterbatch (manufactured by Tokyo Printing Ink MFG. Co., Ltd., "PPM AO-135"), which contained a homopolypropylene [manufactured by Prime Polymer Co., Ltd., RS1238A] as a main raw material, and 5% by mass in total of a phenol-based antioxidant and a phosphorus-based antioxidant (manufactured by BASF SE, trade name: Irgafos 168 [tris(2,4-di-t-butylphenyl) phosphite]] in a mass ratio of 1:1, in Example 1. The various conditions and evaluation results are shown in Table 1.

Comparative Example 1

A chargeable sheath/core-structured fiber, a nonwoven fabric and an electret nonwoven fabric were obtained as in Example 1, except for depositing, as the (c) finishing oil, 0.4% by mass of an alkyl phosphate salt being an anionic surfactant, in Example 1. The various conditions and evaluation results are shown in Table 1.

Comparative Example 2

A chargeable sheath/core-structured fiber, a nonwoven fabric and an electret nonwoven fabric were obtained as in Example 2, except for depositing, as the finishing oil, 0.4% by mass of the same alkyl phosphate salt as that of Comparative Example 1, in Example 2. The various conditions and evaluation results are shown in Table 1.

Comparative Example 3

A chargeable sheath/core-structured fiber, a nonwoven fabric and an electret nonwoven fabric were obtained as in Example 1, except for blending, in the sheath-side raw material, no (a) maleic anhydride-modified polypropylene, and altering the amount of the homopolypropylene to 80% by mass, in Example 1. The various conditions and evaluation results are shown in Table 1.

Comparative Example 4

A chargeable sheath/core-structured fiber, a nonwoven fabric and an electret nonwoven fabric were obtained as in Example 2, except for blending, in the sheath-side raw material, no (a) maleic anhydride-modified polypropylene, and altering the amount of the homopolypropylene to 80% by mass, in Example 2. The various conditions and evaluation results are shown in Table 1.

Comparative Example 5

A chargeable sheath/core-structured fiber, a nonwoven fabric and an electret nonwoven fabric were obtained as in Example 1, except for using no (b) antioxidant in the sheath-side raw material, and altering the amount of the homopolypropylene to 90% by mass, in Example 1. The various conditions and evaluation results are shown in Table 1.

Comparative Example 6

A chargeable sheath/core-structured fiber, a nonwoven fabric and an electret nonwoven fabric were obtained as in Example 1, except for using no (b) antioxidant in the sheath-side raw material, depositing, as the (c) finishing oil, 0.4% by mass of an alkyl phosphate salt being an anionic surfactant, and altering the amount of the homopolypropylene to 90% by mass, in Example 1. The various conditions and evaluation results are shown in Table 2.

Comparative Example 7

A chargeable sheath/core-structured fiber, a nonwoven fabric and an electret nonwoven fabric were obtained as in Example 1, except for blending no (a) maleic anhydride-modified polypropylene in the sheath-side raw material, depositing, as the (c) finishing oil, 0.4% by mass of an alkyl phosphate salt being an anionic surfactant, and altering the amount of the homopolypropylene to 80% by mass, in Example 1. The various conditions and evaluation results are shown in Table 2.

Comparative Example 8

A chargeable sheath/core-structured fiber, a nonwoven fabric and an electret nonwoven fabric were obtained as in Example 2, except for blending no (a) maleic anhydride-modified polypropylene in the sheath-side raw material, depositing, as the (c) finishing oil, 0.4% by mass of an alkyl phosphate salt being an anionic surfactant, and altering the amount of the homopolypropylene to 80% by mass, in Example 2. The various conditions and evaluation results are shown in Table 2.

Comparative Example 9

A chargeable sheath/core-structured fiber, a nonwoven fabric and an electret nonwoven fabric were obtained as in Example 1 and Example 2, except for using no (a) maleic anhydride-modified polypropylene and no (b) antioxidant in the sheath-side raw material, depositing, as the (c) finishing oil, 0.4% by mass of the same polyoxyethylene(4) lauryl ether alone, and altering the amount of the homopolypropylene to 100% by mass, in Example 1 and Example 2. The various conditions and evaluation results are shown in Table 2.

Comparative Example 10

A chargeable sheath/core-structured fiber, a nonwoven fabric and an electret nonwoven fabric were obtained as in Example 1 and Example 2, except for blending no (a) maleic anhydride-modified polypropylene and no (b) antioxidant in the sheath-side raw material, depositing, 0.4% by mass of an alkyl phosphate salt, and altering the amount of the homopolypropylene to 100% by mass, in Example 1 and Example 2. The various conditions and evaluation results are shown in Table 2.

Comparative Example 11

A chargeable sheath/core-structured fiber, a nonwoven fabric and an electret nonwoven fabric were obtained by using the same (c) finishing oil, as in Example 1, except for using, as the sheath-side raw material, a high-density polyethylene [manufactured by Keiyo Polyethylene Co., Ltd., S6932, MFR: 20 g/10 min, melting point: 130° C.], blending no (a) maleic anhydride-modified polypropylene and no (b) antioxidant, wherein the amount of the high-density polyethylene was 100% by mass, in Example 1. The various conditions and evaluation results are shown in Table 2.

TABLE 1

| | | | | Example 1 | Example 2 | Comparative Example 1 | Comparative Example 2 |
|---|---|---|---|---|---|---|---|
| Production of Chargeable Sheath/core-Structured Fiber | Composition of Raw Material | Core-Side Raw Material (A) | Polypropylene-based resin (I) | Homopolypropylene (RS1238A) | Homopolypropylene (RS1238A) | Homopolypropylene (RS1238A) | Homopolypropylene (RS1238A) |
| | | | MFR (g/10 min) | 40 | 40 | 40 | 40 |
| | | Sheath-Side Raw Material (B) | Polypropylene-based resin (I) | Homopolypropylene (RS1238A) | Homopolypropylene (RS1238A) | Homopolypropylene (RS1238A) | Homopolypropylene (RS1238A) |
| | | | MFR (g/10 min) | 40 | 40 | 40 | 40 |
| | | | (a) Modifying agent | maleic anhydride-modified polypropylene (Umex 1001) | maleic anhydride-modified polypropylene (Umex 1001) | maleic anhydride-modified polypropylene (Umex 1001) | maleic anhydride-modified polypropylene (Umex 1001) |
| | | | MFR (g/10 min) | 1550 | 1550 | 1550 | 1550 |
| | | | (b) Antioxidant | Sulfur-based antioxidant (1%) | Phenol/phosphorus = 50/50-based antioxidant (1%) | Sulfur-based antioxidant (1%) | Phenol/phosphorus = 50/50-based antioxidant (1%) |
| | | | Mass ratio (I:a:b)* | 89:10:1 | 89:10:1 | 89:10:1 | 89:10:1 |
| | Oil | | Main component of (c) finishing oil | Polyoxyethylene(4) lauryl ether | Polyoxyethylene(4) lauryl ether | Alkyl phosphate salt | Alkyl phosphate salt |
| | | | Oil deposition rate (%) | 0.4 | 0.4 | 0.4 | 0.4 |
| Initial Charge Quantity (−kV) | | | | 4.71 | 4.47 | 4.63 | 5.34 |
| Charge Retention Rate (%) | | | After 5 s of thermostatic storage after 2 hr of 90° C. heating | 94.8 | 91.4 | 5.8 | 18.8 |
| | | | After 10 s of thermostatic storage | 88.6 | 84.4 | 4.7 | 18.2 |
| | | | After 60 s of thermostatic storage | 82.2 | 77.9 | 1.6 | 15.9 |
| | | | After 180 s of thermostatic storage | 80.1 | 74.1 | 0.9 | 10.0 |
| | | | After 300 s of thermostatic storage | 78.2 | 72.1 | 0.5 | 7.0 |
| | | | After 600 s of thermostatic storage | 75.4 | 69.4 | 0.5 | 4.5 |

TABLE 1-continued

|  |  |  |  | Comparative Example 3 | Comparative Example 4 | Comparative Example 5 |
|---|---|---|---|---|---|---|
| Production of Chargeable Sheath/core-Structured Fiber | Composition of Raw Material | Core-Side Raw Material (A) | Polypropylene-based resin (I) | Homopolypropylene (RS1238A) | Homopolypropylene (RS1238A) | Homopolypropylene (RS1238A) |
|  |  |  | MFR (g/10 min) | 40 | 40 | 40 |
|  |  | Sheath-Side Raw Material (B) | Polypropylene-based resin (I) | Homopolypropylene (RS1238A) | Homopolypropylene (RS1238A) | Homopolypropylene (RS1238A) |
|  |  |  | MFR (g/10 min) | 40 | 40 | 40 |
|  |  |  | (a) Modifying agent | None | None | maleic anhydride-modified polypropylene (Umex 1001) |
|  |  |  | MFR (g/10 min) | — | — | 1550 |
|  |  |  | (b) Antioxidant | Sulfur-based antioxidant (1%) | Phenol/phosphorus = 50/50-based antioxidant (1%) | None |
|  |  |  | Mass ratio (I:a:b)* | 99:0:1 | 99:0:1 | 90:10:0 |
|  | Oil |  | Main component of (c) finishing oil | Polyoxyethylene(4) lauryl ether | Polyoxyethylene(4) lauryl ether | Polyoxyethylene(4) lauryl ether |
|  |  |  | Oil deposition rate (%) | 0.4 | 0.4 | 0.4 |
|  |  |  | Initial Charge Quantity (−kV) | 4.66 | 4.35 | 4.87 |
|  |  | Charge Retention Rate (%) | After 5 s of thermostatic storage after 2 hr of 90° C. heating | 5.1 | 12.3 | 84.6 |
|  |  |  | After 10 s of thermostatic storage | 4.7 | 11.6 | 80.3 |
|  |  |  | After 60 s of thermostatic storage | 4.2 | 11.0 | 75.4 |
|  |  |  | After 180 s of thermostatic storage | 3.5 | 10.2 | 68.0 |
|  |  |  | After 300 s of thermostatic storage | 3.1 | 9.5 | 63.0 |
|  |  |  | After 600 s of thermostatic storage | 2.5 | 8.4 | 58.9 |

Note*:
(I) in the mass ratio of the sheath (B), in the case of containing an antioxidant, contained the mass of the polypropylene-based resin in a masterbatch.

TABLE 2

|  |  |  |  | Comparative Example 6 | Comparative Example 7 | Comparative Example 8 |
|---|---|---|---|---|---|---|
| Production of Chargeable Sheath/core-Structured Fiber | Composition of Raw Material | Core-Side Raw Material (A) | Polypropylene-based resin (I) | Homopolypropylene (RS1238A) | Homopolypropylene (RS1238A) | Homopolypropylene (RS1238A) |
|  |  |  | MFR (g/10 min) | 40 | 40 | 40 |
|  |  | Sheath-Side Raw Material (B) | Polypropylene-based resin (I) | Homopolypropylene (RS1238A) | Homopolypropylene (RS1238A) | Homopolypropylene (RS1238A) |
|  |  |  | MFR (g/10 min) | 40 | 40 | 40 |
|  |  |  | (a) Modifying agent | Maleic anhydride-modified polypropylene (Umex 1001) | None | None |
|  |  |  | MFR (g/10 min) | 1550 | — | — |
|  |  |  | (b) Antioxidant | None | Sulfur-based antioxidant (1%) | Phenol/phosphorus = 50/50-based antioxidant (1%) |
|  |  |  | Mass ratio (I:a:b)* | 90:10:0 | 99:0:1 | 99:0:1 |
|  | Oil |  | Main component of (c) finishing oil | Alkyl phosphate salt | Alkyl phosphate salt | Alkyl phosphate salt |
|  |  |  | Oil deposition rate (%) | 0.4 | 0.4 | 0.4 |
|  |  |  | Initial Charge Quantity (−kV) | 4.63 | 4.58 | 4.51 |

TABLE 2-continued

| | | | | | | |
|---|---|---|---|---|---|---|
| Charge Retention Rate (%) | After 5 s of thermostatic storage after 2 hr of 90° C. heating | | | 5.5 | 5.9 | 11.9 |
| | After 10 s of thermostatic storage | | | 4.2 | 3.6 | 11.0 |
| | After 60 s of thermostatic storage | | | 1.6 | 1.2 | 10.2 |
| | After 180 s of thermostatic storage | | | 0.3 | 0.8 | 9.1 |
| | After 300 s of thermostatic storage | | | 0.0 | 0.4 | 8.1 |
| | After 600 s of thermostatic storage | | | 0.0 | 0.2 | 7.2 |

| | | | | Comparative Example 9 | Comparative Example 10 | Comparative Example 11 |
|---|---|---|---|---|---|---|
| Production of Chargeable Sheath/core-Structured Fiber | Composition of Raw Material | Core-Side Raw Material (A) | Polypropylene-based resin (I) | Homopolypropylene (RS1238A) | Homopolypropylene (RS1238A) | Homopolypropylene (RS1238A) |
| | | | MFR (g/10 min) | 40 | 40 | 40 |
| | | Sheath-Side Raw Material (B) | Polypropylene-based resin (I) | Homopolypropylene (RS1238A) | Homopolypropylene (RS1238A) | High-density polyethylene (S6932) |
| | | | MFR (g/10 min) | 40 | 40 | 20 |
| | | | (a) Modifying agent | None | None | None |
| | | | MFR (g/10 min) | — | — | — |
| | | | (b) Antioxidant | None | None | None |
| | | | Mass ratio (I:a:b)* | 100:0:0 | 100:0:0 | 100:0:0 |
| | Oil | | Main component of (c) finishing oil | Polyoxyethylene(4) lauryl ether | Alkyl phosphate salt | Polyoxyethylene(4) lauryl ether |
| | | | Oil deposition rate (%) | 0.4 | 0.4 | 0.4 |
| | | Initial Charge Quantity (−kV) | | 4.64 | 5.87 | 5.04 |
| | Charge Retention Rate (%) | After 5 s of thermostatic storage after 2 hr of 90° C. heating | | 81.3 | 5.8 | 70.2 |
| | | After 10 s of thermostatic storage | | 78.0 | 4.4 | 67.0 |
| | | After 60 s of thermostatic storage | | 73.0 | 1.3 | 62.6 |
| | | After 180 s of thermostatic storage | | 65.9 | 0.6 | 59.5 |
| | | After 300 s of thermostatic storage | | 61.0 | 0.4 | 57.0 |
| | | After 600 s of thermostatic storage | | 57.3 | 0.3 | 51.9 |

Note*:
(I) in the mass ratio of the sheath (B), in the case of containing an antioxidant, contained the mass of the polypropylene-based resin in a masterbatch.

From the results of Table 1, in Examples 1 and 2 of the present invention, the charge retention rate after being stored in the thermostatic chamber for 5 s after being heated at 90° C. for 2 hours after being charged was 94.8% in Example 1, and 91.4% in Example 2; and the charge retention rate after being stored in the thermostatic chamber for 600 s thereafter was 75.4% in Example 1, and 69.4% in Example 2; from these results, it could be confirmed that the charge retention rate was in the range of being capable of being put in practical use as a vehicular electret filter requiring a heat resistance.

By contrast, in Comparative Examples 1 and 2, which used, as the (c) finishing oil, an alkyl phosphate salt being an anionic surfactant, the charge retention rate after being stored in the thermostatic chamber for 5 s after being heated at 90° C. for 2 hours after being charged was 5.8% in Comparative Example 1, and 18.8% in Comparative Example 2, and the charge decay rate thereafter was also remarkably high. Also in Comparative Example 6, which used the same alkyl phosphate salt, as the finishing oil and contained no (b) antioxidant, and Comparative Example 7, which used the same alkyl phosphate salt, as the finishing oil and contained no (a) maleic anhydride-modified polyolefin, the same tendency was seen.

In Comparative Example 3, which was a case where no (a) modifying agent was used in Example 1, and Comparative Example 4, which was a case where no (a) modifying agent was used in Example 2, the charge retention rate after being stored in the thermostatic chamber for 5 s after being heated at 90° C. for 2 hours after being charged was 5.1% in Comparative Example 3, and 12.3% in Comparative Example 4, and the charge decay rate thereafter was also remarkably high.

In Comparative Example 5, which used no (b) antioxidant, the charge retention rate had a tendency of lowering more than in Examples 1 and 2. That is, when the electret nonwoven fabric was heated at 90° C. for 2 hours, and allowed to stand as it was for 10 min in the humidity-conditioned room (temperature: 20° C., humidity: 65%), whereas the Examples retained a charge rate of 69% or higher, the case of no use of an antioxidant exhibited 60% or lower.

Further in Comparative Example 6, which, as the (c) finishing oil, did not contain 50% by mass or more of a specific polyoxyalkylene alkyl ether as a main component and contained an alkyl phosphate salt as a main component, and contained no (b) antioxidant as compared with Examples 1 and 2, Comparative Example 7, which contained no (a) modifying agent as compared with Example 1, Comparative Example 8, which contained no (a) modifying agent as compared with Example 2, and further Comparative Example 10, which contained no (a) modifying agent and no (b) antioxidant, the any Comparative Examples were extremely inferior in the charge retention rate after being heated at 90° C. for 2 hours and the charge retention rate after 10 min (600 s) to the Examples.

Further in Comparative Example 11, which used, as the sheath-side raw material, a high-density polyethylene having a melting point of 130° C., the charge retention rate after being stored in the thermostatic chamber for 5 s after being treated at 90° C. for 2 hours was 70.2%, which was lower by 20% or more than in the Examples, and the charge retention rate after 10 min also had a value lower by about 20%, which had a problem with the heat resistance for the application as a vehicular filter.

The chargeable sheath/core-structured fiber of the present invention can effectively be utilized as a constituent fiber for vehicular filters requiring a heat resistance and a high electret function. That is, nonwoven fabrics or composite nonwoven fabrics are made through webs of the chargeable sheath/core-structured fiber, and electretized, and can be utilized as nonwoven fabric processed articles. In the electretization treatment, since the nonwoven fabrics or composite nonwoven fabrics can sufficiently be charged without having been subjected to a cleaning process of the finishing oil, while the production cost is suppressed, these can be utilized for nonwoven fabric processed articles such as air filters, wipers and vehicular filters requiring the dust collecting effect. Further, the chargeable sheath/core-structured fiber can be utilized for a production method of nonwoven fabric processed articles.

The invention claimed is:

1. A chargeable sheath/core-structured fiber, being a sheath/core-structured fiber comprising a polypropylene-based resin as a main resin in the sheath part and the core part and having a mass ratio of the sheath part to the core part of 70/30 to 30/70,
   wherein the sheath part comprises
   (a) 3 to 20% by mass of a carboxylic anhydride-modified polyolefin and
   (b) 0.5 to 3.0% by mass of at least one antioxidant selected from the group consisting of a combined antioxidant of a phenolic antioxidant and a phosphorus-based antioxidant, and sulfur-based antioxidants; and
      (c) 0.1 to 1.0% by mass, based on a total mass of the sheath/core-structured fiber, of an oil containing 50% by mass or more of a polyoxyalkylene alkyl ether represented by the general formula (I) as a finishing oil is deposited on the outer surface of the sheath part:

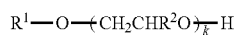

General Formula (I)

wherein $R^1$ represents a saturated or unsaturated aliphatic hydrocarbon group having 10 to 30 carbon atoms; $R^2$ represents a hydrogen atom or a methyl group; and k is an integer of 1 to 4.

2. The chargeable sheath/core-structured fiber according to claim 1, wherein the finishing oil is polyoxyethylene(4) lauryl ether, which corresponds to the general formula (I) wherein k is 4.

3. The chargeable sheath/core-structured fiber according to claim 1, wherein the phosphorus-based antioxidant is tris(2,4-di-t-butylphenyl) phosphite.

4. The chargeable sheath/core-structured fiber according to claim 1, wherein the polypropylene-based resin is a homopolypropylene; and the (a) carboxylic anhydride-modified polyolefin is a maleic anhydride-modified polypropylene.

5. The chargeable sheath/core-structured fiber according to claim 1, wherein the fiber has a fiber length of 3 to 120 mm and a fineness of 0.5 to 10 dtex.

6. A nonwoven fabric, being obtained by a dry nonwoven fabric processing method using the chargeable sheath/core-structured fiber according to claim 1 alone, or the chargeable sheath/core-structured fiber mixed with a heat-adhesive fiber and/or another fiber.

7. The nonwoven fabric according to claim 6, wherein the dry nonwoven fabric processing method is any one selected from the group consisting of a thermal bond method, a needle-punched method, a spunlace method, a chemical bond method and an air-laid method.

8. The nonwoven fabric according to claim 6, wherein the heat-adhesive fiber is a sheath/core-structured fiber comprising a low-melting point component as a sheath component; and the sheath component is a polyethylene-based resin.

9. A composite nonwoven fabric, being obtained by combining the chargeable sheath/core-structured fiber according to claim 1 with at least one selected from the group consisting of other fibers, nonwoven fabrics, films, pulp sheets, knitted fabrics and woven fabrics.

10. A nonwoven fabric processed article, comprising the nonwoven fabric according to claim 6, or a composite nonwoven fabric being obtained by a chargeable sheath/core-structured fiber being a sheath/core-structured fiber comprising a polypropylene-based resin as a main resin in the sheath part and the core part and having a mass ratio of the sheath part to the core part of 70/30 to 30/70,
   wherein the sheath part comprises
   (a) 3 to 20% by mass of a carboxylic anhydride-modified polyolefin and
   (b) 0.5 to 3.0% by mass of at least one antioxidant selected from the group consisting of a combined antioxidant of a phenolic antioxidant and a phosphorus-based antioxidant, and sulfur-based antioxidants; and
      (c) 0.1 to 1.0% by mass, based on a total mass of the sheath/core-structured fiber, of an oil containing 50% by mass or more of a polyoxyalkylene alkyl ether represented by the general formula (I) as a finishing oil is deposited on the outer surface of the sheath part:

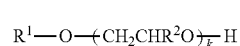

General Formula (I)

wherein $R^1$ represents a saturated or unsaturated aliphatic hydrocarbon group having 10 to 30 carbon atoms; $R^2$ represents a hydrogen atom or a methyl group; and k is an integer of 1 to 4, the chargeable sheath/core-structured fiber combined with at least one selected from the group consisting of other fibers, nonwoven fabrics, films, pulp sheets, knitted fabrics and woven fabrics.

11. The nonwoven fabric processed article according to claim 10, wherein the nonwoven fabric processed article has been electretized.

12. The nonwoven fabric processed article according to claim 11, wherein the nonwoven fabric processed article is any one of an air filter, a wiper and a mask.

13. The nonwoven fabric processed article according to claim 12, wherein the air filter is a vehicular air filter.

14. A method for producing a nonwoven fabric processed article, comprising a step of electretizing the nonwoven fabric according to claim 6 or a composite nonwoven fabric being obtained by a chargeable sheath/core-structured fiber being a sheath/core-structured fiber comprising a polypropylene-based resin as a main resin in the sheath part and the core part and having a mass ratio of the sheath part to the core part of 70/30 to 30/70, wherein the sheath part comprises
(a) 3 to 20% by mass of a carboxylic anhydride-modified polyolefin and
(b) 0.5 to 3.0% by mass of at least one antioxidant selected from the group consisting of a combined antioxidant of a phenolic antioxidant and a phosphorus-based antioxidant, and sulfur-based antioxidants; and
  (c) 0.1 to 1.0% by mass, based on a total mass of the sheath/core-structured fiber, of an oil containing 50% by mass or more of a polyoxyalkylene alkyl ether represented by the general formula (I) as a finishing oil is deposited on the outer surface of the sheath part:

General Formula (I)

wherein $R^1$ represents a saturated or unsaturated aliphatic hydrocarbon group having 10 to 30 carbon atoms; $R^2$ represents a hydrogen atom or a methyl group; and k is an integer of 1 to 4, the chargeable sheath/core-structured fiber combined with at least one selected from the group consisting of other fibers, nonwoven fabrics, films, pulp sheets, knitted fabrics and woven fabrics.

* * * * *